US007571461B2

(12) United States Patent
Kwok et al.

(10) Patent No.: US 7,571,461 B2
(45) Date of Patent: Aug. 4, 2009

(54) PERSONAL WEBSITE FOR ELECTRONIC COMMERCE ON A SMART JAVA CARD WITH MULTIPLE SECURITY CHECK POINTS

(75) Inventors: Thomas Y. Kwok, Washington Township, NJ (US); Lawrence S. Mok, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 10/953,711

(22) Filed: Sep. 29, 2004

(65) Prior Publication Data

US 2005/0050366 A1    Mar. 3, 2005

Related U.S. Application Data

(62) Division of application No. 09/237,387, filed on Jan. 26, 1999, now Pat. No. 6,829,711.

(51) Int. Cl.
*H04L 9/32* (2006.01)

(52) U.S. Cl. ............... 726/2; 726/1; 726/26; 713/168; 713/182; 713/183; 713/176; 709/220

(58) Field of Classification Search ............ 713/176, 713/183, 186, 175, 168, 182, 185; 726/2, 726/5, 9, 26, 1, 27; 717/151, 162; 709/220
See application file for complete search history.

(56) References Cited

U.S. PATENT DOCUMENTS 4,993,068 A * 2/1991 Piosenka et al. ............ 713/186

| 5,068,894 | A | | 11/1991 | Hoppe | |
|---|---|---|---|---|---|
| 5,590,197 | A | * | 12/1996 | Chen et al. | 705/65 |
| 5,721,781 | A | * | 2/1998 | Deo et al. | 705/67 |
| 5,757,918 | A | * | 5/1998 | Hopkins | 705/67 |

(Continued)

FOREIGN PATENT DOCUMENTS

| JP | 3046391 | 12/1997 |
|---|---|---|
| JP | 10-154192 | 6/1998 |
| WO | WO 96/36934 | 11/1996 |

OTHER PUBLICATIONS

Scott B Guthery, Java Card: Internet Computing on a Smart Card, IEEE, 1997.*

(Continued)

*Primary Examiner*—Nasser G Moazzami
*Assistant Examiner*—Shanto M Abedin
(74) *Attorney, Agent, or Firm*—Scully, Scott, Murphy & Presser, P.C.; Daniel P. Morris, Esq.

(57) ABSTRACT

A Method and system are disclosed for accessing personal Web site or executing electronic commerce with security in a smart Java card. A personal Web site which includes personal or private information is stored in a personal smart Java card. Before a user can access the Web site stored in the smart Java card, the user is validated by any one of or in combination of PIN, facial images, hand images, eye image, voice characteristics, and finger prints. In addition, an encryption engine embedded in the smart Java card decodes and compares the entered PIN combined with a secure key or security certificate to verify the identity of the user. Before the bank account can be accessed freely by the user, the bank's computer system checks the combined secure data to ensure the authenticity of the card and the user's identity with multiple check points using Internet security protocols via Web browsers.

15 Claims, 4 Drawing Sheets

U.S. PATENT DOCUMENTS

| | | | |
|---|---|---|---|
| 5,778,072 A | | 7/1998 | Samar |
| 5,848,412 A | * | 12/1998 | Rowland et al. ............... 707/9 |
| 5,982,520 A | * | 11/1999 | Weiser et al. ............... 398/126 |
| 6,018,764 A | | 1/2000 | Field et al. |
| 6,078,928 A | * | 6/2000 | Schnase et al. .......... 707/104.1 |
| 6,173,284 B1 | | 1/2001 | Brown |
| 6,194,992 B1 | * | 2/2001 | Short et al. ............... 340/5.9 |
| 6,233,341 B1 | * | 5/2001 | Riggins ............... 380/277 |
| 6,266,539 B1 | | 7/2001 | Pardo |
| 6,272,470 B1 | | 8/2001 | Teshima |
| 6,311,272 B1 | * | 10/2001 | Gressel ............... 713/186 |
| 6,385,729 B1 | * | 5/2002 | DiGiorgio et al. ............... 726/9 |
| 6,412,073 B1 | * | 6/2002 | Rangan ............... 726/5 |
| 6,460,138 B1 | * | 10/2002 | Morris ............... 713/184 |
| 6,609,199 B1 | * | 8/2003 | DeTreville ............... 713/172 |
| 6,799,177 B1 | * | 9/2004 | Fai et al. ............... 707/9 |
| 7,036,738 B1 | * | 5/2006 | Vanzini et al. ............... 235/486 |
| 2001/0039587 A1 | * | 11/2001 | Uhler et al. ............... 709/229 |

OTHER PUBLICATIONS

Turban et al, Using Smart Cards in Electronic Commerce, IEEE, 1998.*

Steinauer et al, Trust and Traceability in Electronic Commerce, StandardView, 1997.*

M. Schlumberger; "Smart Cards to Catalyse 'Electronic-Commerce Explosion'"; Press release (1997).

"Java Card: Internet Computing on a Smart Card"; IEEE Internet Computing, vol. 1, pp. 57-59 (1997).

"Java, Language of the Year Zero": Informatie, vol. 39, pp. 59-64, (1997).

"The Smart-Card: Just How Smart Is It": University of Maryland Website.

Electronics, Ohm Inc., vol. 41, N5; pp. 52-53, dated May 1, 1996.

Fuzita and others, "Internet Niokeru Security Gizyo Tunoyakuwari", NEC Creative Inc., vol. 49, N7, pp. 276-281.

Published Unexamined Patent Application No. 10-269284, dated Jun. 9, 1998.

Published Unexamined Patent Application No. 10-222446, dated Aug. 8, 1998.

Published Unexamined Patent Application No. 06-017565, dated Jan. 25, 1994.

Chen George, "Series: Java Taiozisedaicardnokatyo Ho Daiyonkai: Java Card 2. Oworikaysuru". Java World, IDG Communication Inc., vol. 2, n7, pp. 154-161, Jul. 1, 1998.

SakuRai. "Internetniokeruninshogizyutu", NEC technical report NEC Creativ Inc. vol. 51, n9, pp. 105-112, Sep. 25, 1998.

Kataki and others, "Ango Security Gizyutu No Genjototenbo", Mitsubishi Technical Report, Mitsubishi Engineering Inc., vol. 72, n5, pp. 2-7, May 25, 1998.

* cited by examiner

PERSONAL WEBSITE FOR ELECTRONIC COMMERCE ON A SMART JAVA CARD WITH MULTIPLE SECURITY CHECK POINTS

CROSS REFERENCE TO RELATED APPLICATIONS

The present application is a divisional application of application Ser. No. 09/237,387, filed Jan. 26, 1999 now U.S. Pat. No. 6,829,711.

FIELD OF THE INVENTION

This invention relates to the electronic commerce on the Internet using a smart card and, in particular, to methods and systems for accessing and retrieving information from a personal web site stored in a smart Java card with security.

PRIOR ART

A smart card typically includes a plastic carrier, in which is embedded a specially designed integrated circuit (IC) and either a set of contacts or an aerial for the contactless operation. It contains at least one of three types of memories (ROM, RAM, and EEPROM) and/or a microprocessor. A smart card also needs to conform to the ISO 7810-7813 (bank card size and thickness), ISO 7816, EMV, ETSI standards. The most important aspect of the smart card is the ability to control the access to the card's memory by the use of password protection and/or other security mechanisms. Other important components of the system incorporating a smart card include the smart card reading devices and computer systems which access the information on the card during operation, and the systems which manufacture, issue, and control the smart card and the various encoding keys contained in the card.

A typical implementation of data security in computer systems involves providing a mechanism for proving the identity of the person sending or receiving messages and assuring that the message contents have not been altered. That is, confidentiality, authentication, integrity and nonrepudiation are four modern data communications security requirements. These requirements can all be managed by using a form of cryptology. Cryptology, as well known by the persons skilled in the art, is a science of codes and ciphers. In cryptology, original data or plaintext is encrypted using a key. The encrypted data, or ciphertext, usually appears to be a meaningless series of bits which cannot be understood by anyone reading it. To restore the data into a readable text, the receiving person must decrypt the encrypted data. A typical encryption technique includes two main components: an algorithm, and a key. The same or a different algorithm/key pair may be employed by a decryption technique for decoding the encrypted data back to a readable text. Before the data is encrypted, the data is often scrambled or rearranged for further security. Encryption techniques are also used in digital signatures to authenticate the signing party.

Presently, smart cards are used throughout the industrialized countries to identify, to travel, to gain access to buildings, to obtain cash from the bank, to place telephone calls, and to pay for goods and services. Many governments use smart cards to pay welfare, medical, family and social benefits. The cards which are prevalent in daily applications usually have a memory governed by a type of fixed logic, but typically do not include a microprocessor.

Java is the object-oriented computer language that makes programming and distributing software easier and more secure because programs written in Java language are platform independent and have built-in security. Because the leading smart card manufacturers are developing smart cards with common operating system based on the Java Card API, the smart Java cards will become interoperable in almost any computer system. An application included in the smart Java card can be subsequently modified or updated with ease and convenience by a user. Moreover, the smart Java cards are not limited to having one application. Constrained only by a memory capacity, the smart Java cards can hold more than one application per card.

The widespread availability of World Wide Web (WWW or Web) phones, Personal Data Assistants (PDAs), and Windows-based CE machines with Internet connectivity provides anyone within reach of those devices a world wide access to the Internet. With such a wide access to the Internet, it is highly desirable to have efficient techniques for accessing the Web pages. An Internet user typically employs a browser to access the Web pages. The most popular browsers currently in use are Netscape's Navigator and Microsoft's Internet Explorer. Storing personal data in the Web page format in a smart Java card will make the card, hence the data, accessable almost everywhere and anytime with built-in security.

The following are some of the articles describing the current state of Smart cards. An article in the University of Maryland Website, http://des.umd.edu/~melody/research/smart_card.html, entitled "The Smart Card: Just How Smart Is It?" lists a variety of current applications of smart cards, for instance, toll payment, personal identification, health care, retail, and travel. With the advent of the Java language, a smart card can be programmed in Java, and hence, referred sometimes as Java cards. A paper in the IEEE Internet Computing, Vol. 1, no. 1, pp. 57-59, January-February 1997, "Java Card: Internet Computing on a Smart Card", describes a scenario of using a smart card as a means to generate and store a private encryption key. As in the Schlumberger press release dated Mar. 13, 1997, "Smart Cards to Catalyse 'Electronic-Commerce Explosion'", the company has developed a set of software tools that enables a secure Internet commerce and a smart card equipped with a Motorola chip that can perform public key encryption and decryption on the card. U.S. Pat. No. 5,590,197, entitled "Electronic Payment System and Method", describes an electronic payment system in the form of an electronic wallet (smart card is one of the electronic forms) that contains protected account information and a file with a set of public keys stored in for encryption has been described.

SUMMARY OF THE INVENTION

It is an object and advantage of this invention to provide improved methods and systems for accessing and retrieving personal information in the smart Java card or executing electronic commerce through the Internet with improved security that overcome the foregoing and other problems.

In the preferred embodiment of the present invention, a user's identity is first verified by the user's unique PIN (Personal Identification Number), optionally accompanied with images of the user's face, hand, and/or eye images. Additional checking of the user's identity in this first step may be performed using the user's voice characteristics and/or finger prints, before enabling the user to access to his or her personal Web site stored in the smart Java card.

Second, a secure key or security certificate, downloaded previously from the card issuer or a bank or financial institution, is stored in the smart Java card. The secure key or security certificate is sent to the host computer or bank ATM when the smart Java card is inserted into the reader. The key or certificate is then combined with the user entered PIN. The combined data is sent back to the smart Java card. The encryption engine in the card decodes the combined data to recover the PIN which is then compared with the authentic PIN stored in the card. If the PIN is correct, the secure personal Web page is sent to the host computer. Similarly, a bank or a financial institution may verify the authenticity of the card and the user's identity whenever the user tries to electronically access the data associated with the financial institution through the Web browsers.

The methods and systems of this invention are particularly useful for authorized access to personal links, such as bank accounts, because the smart Java card has a capacity to store personal keys. Moreover, the smart Java card includes an encryption engine which manipulates the personal keys with other required user inputs to verify and authenticate the identity of the user. With the secure information and the encryption engine stored in the smart Java card, the present invention provides for security verifications at multiple check points, allowing the user to conduct electronic transactions including electronic commerce with improved security.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED-EMBODIMENT OF THE INVENTION

Figure 1:
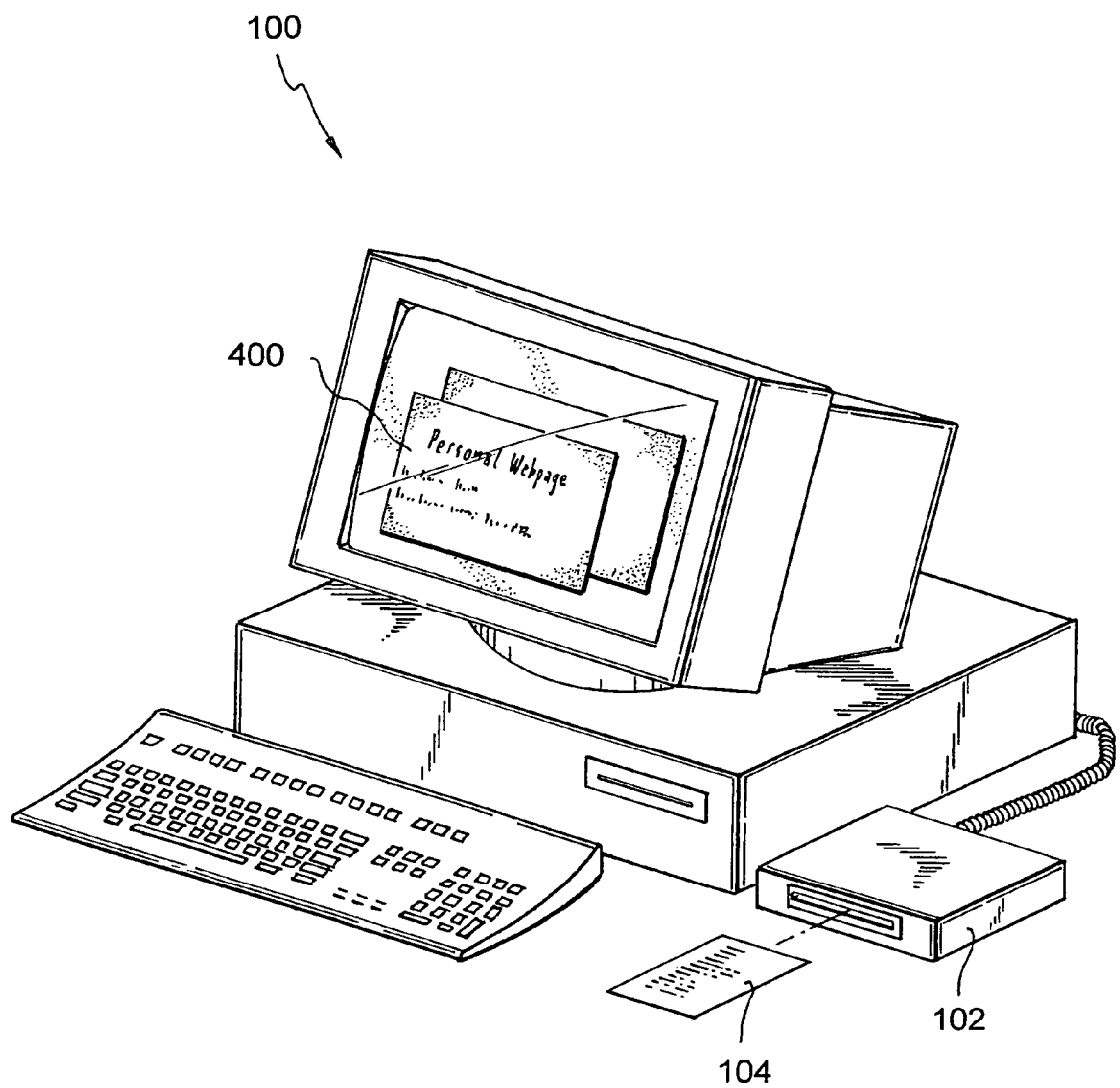
FIG. 1 is a schematic diagram showing the personal computer equipped with a card reader which accesses the smart Java card of the present invention.

The present invention is directed to a method and system for accessing a personal Web site stored in a smart Java card. The Web site can include, inter alia, security information such as personal identification numbers needed to access various financial accounts, and information needed to check and activate credit cards charges, for example, used in electronic commerce. In the preferred embodiment of the present invention, a personal Web site including personal or private information is stored in a personal smart Java card. Before a user can access the personal Web site, the private information, such as the PIN, user's facial images, finger prints, eye image, voice characteristics, are compared with those of the user's information previously stored in the smart Java card.

Furthermore, with information stored in a Web page on the smart Java card, additional Web sites whose Uniform Resource Locators (URLs) are typically encoded as hypertexts on a Web page can also be accessed via the Internet. Moreover, if these Web sites require an entry of security information before they can be accessed, the security information is automatically provided by the personal Web site stored in the smart Java card, without the user having to enter the information. For example, a password needed to access another Web site may be embedded in the Web page on the smart Java card. When the other Web site is accessed by using the URL, the password is automatically passed to the other Web site by for example, attaching it as a parameter with the URL, or by transmitting the password information as environment variables. By having the secure information including, the passwords needed to access various Web sites over a computer network, e.g., the Internet, embedded in the Web page stored on the smart Java card, the user need not manually enter authentication information when accessing those sites electronically.

To provide additional layer of security check, the smart Java card may include a secure key or security certificate from each institution, e.g., banks, card issuer, credit card company, etc. When the user seeks an access to an account in any one of the institutions, an encryption engine in the smart Java card may combine the user entered PIN with the secure key associated with the institution. The combined secure data is then checked by the institution before the user can access the account via the Internet from the user's personal Web site stored in the smart Java card. Thus, the most important advantage of present invention is the provision of multiple check points performed during various electronic transactions, including the electronic commerce.

In the preferred embodiment, the present invention includes three components. First, a personal Web site having personal and private information such as health records, financial data, link addresses to various accounts in banks or financial institutions and to other Web sites, is stored in his or her personal smart Java card. The personal Web page can generally be viewed by any commercially available Web browsers. Moreover, if the data becomes too large to be stored in the card memory, additional Internet link addresses to the outside Web site for storing the data are provided.

Second, for providing authorized access and secure updates to the personal Web site, the user's PIN, hand, facial and/or, eye images, voice characteristics and/or finger prints are optionally stored in the smart Java card. The card also stores the host authenticity code and includes an encryption engine for checking the authenticity of the host when the card's web page and stored data are being updated.

Third, additional passwords and personal keys used for accessing other Web sites including bank and financial institutions are also stored in the smart Java card.

The secure personal Web site in the smart Java card provides multiple check points for secure electronic commerce. For example, as an initial step, the user's PIN, facial, hand and/or eye images, voice characteristics, finger prints are verified allowing the user to access the Web site. Next, An encryption engine in the smart Java card uses the entered PIN to decode a previously stored secure key or security certificate associated with a Web site, such as a site for a financial institution. Before the user can access the Web site of the financial institution and, for example, the user's bank account at that financial institution, a Web server at that Web site would authenticate the user once again by checking the combined data in the smart Java card to insure the proper identity of the user.

Figure 2:
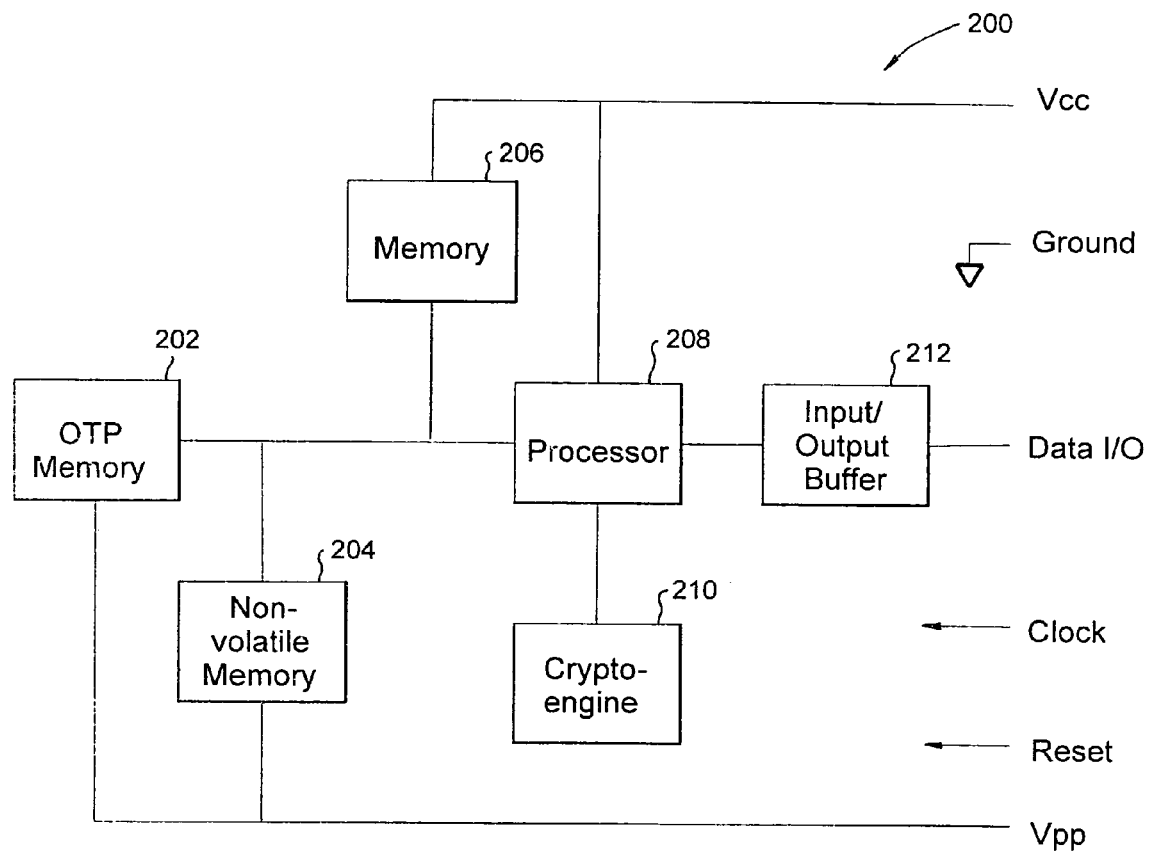
FIG. 2 is the block diagram of the semiconductor chip embedded inside the smart Java card of the present invention with additional One-Time-Programmable memory.
Figure 3:
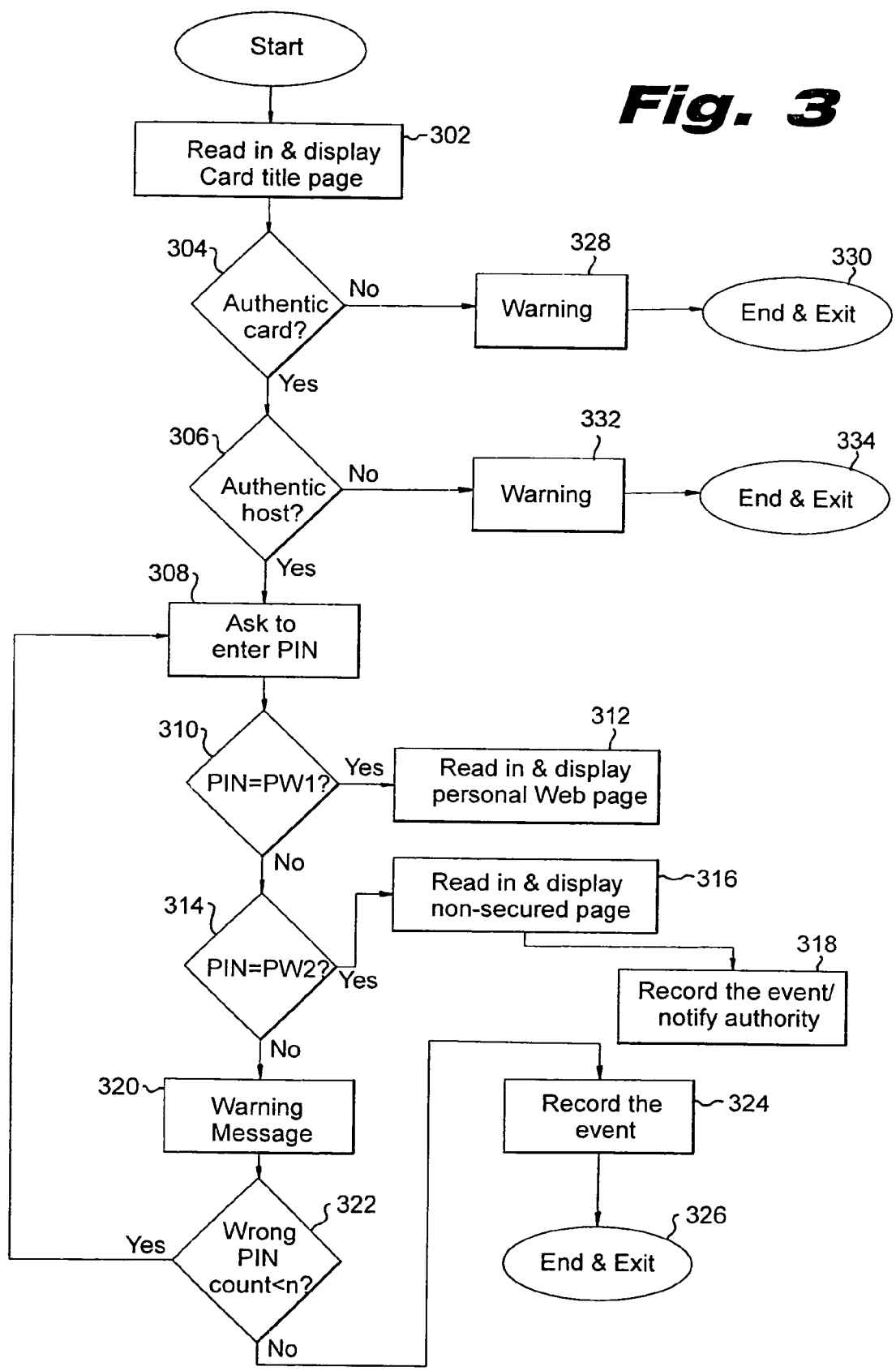
FIG. 3 is the flow chart illustrating the multiple security check procedure of the smart Java card of the present invention.
Figure 4:
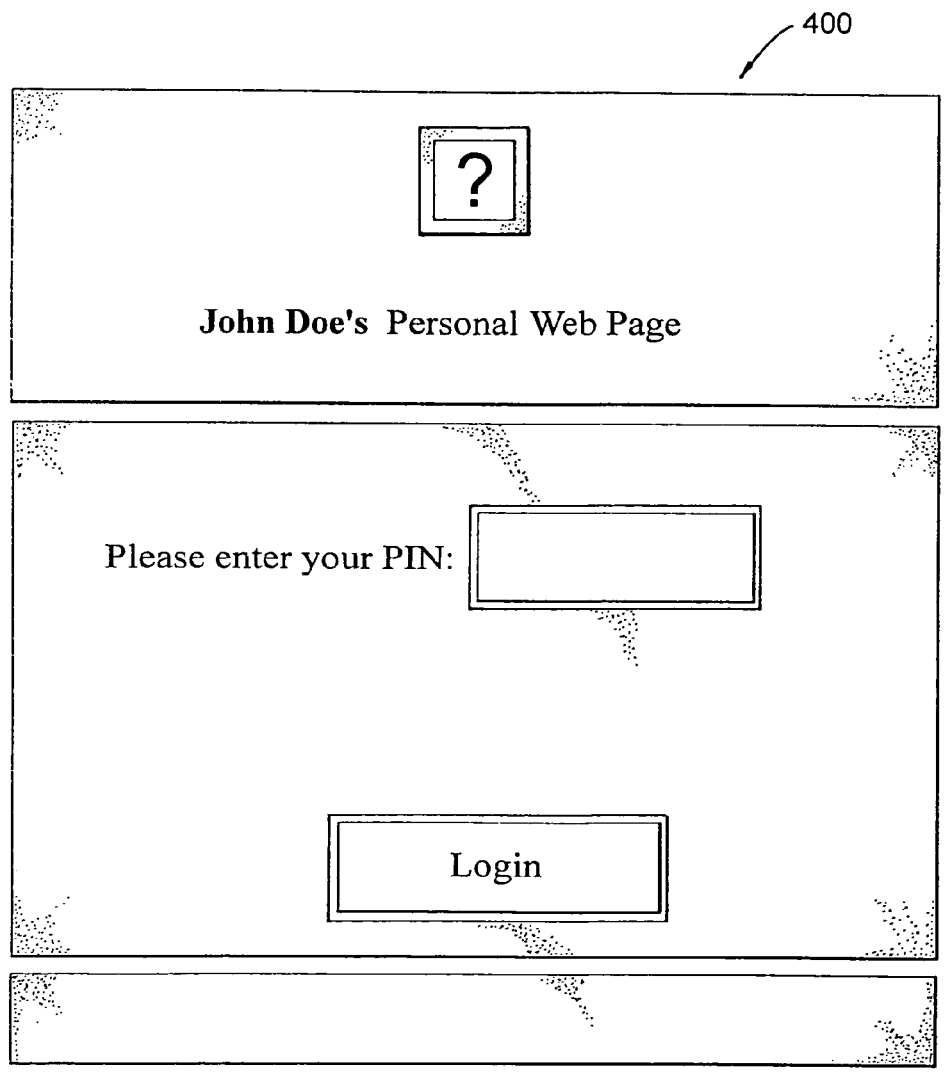
FIG. 4 is and example of a screen image showing an initial personal Web page stored in the smart Java card of the present invention.

FIG. 3 illustrates the typical procedure of accessing the personal Web page stored in a smart Java card. FIG. 1 illustrates a typical computer 100 having a smart card reader 102 connected to the computer 100. When the card 104 is inserted into a card reader connected to a personal computer 100 as shown in FIG. 1, or a bank ATM, the title page of the personal Web site is first displayed through an Internet browser. Referring back to FIG. 3 at step 302, a typical title page 400 as shown in FIG. 4 is displayed. At step 304, the card's authenticity is first checked by the computer processing the smart Java card. If the card is determined not to be authentic, a warning message is displayed at step 328 and the system exits at step 330. Any procedure or protocol used in the Internet can be used to check the card's authenticity, including the digital signature procedure used in the public-key encryption scheme. At step 306. if the card is authentic, the card checks for the authenticity of the host computer using its in-card processor and cryto-engine 210 as shown in FIG. 2. If the host computer is determined not to be authentic, a warning message is displayed at step 332 and the system exits at step 334. If both card and host are authentic, the identity of the card owner is checked. In the example shown at step 308 of FIG. 3, a PIN number is requested. If the entered PIN number is correct at step 310, a personal Web page showing personal and secure information is displayed at step 312.

In the preferred embodiment of the present invention a secondary PIN entry procedure is provided for additional security. The smart Java card processor is equipped to handle a secondary PIN entry during emergency situations. When this secondary PIN is entered, the personal Web page which is normally displayed will not be displayed. Instead, a second Web page which imitates the personal Web page but does not include any secure information is displayed. Since this Web page does not store any secure information, none of the highly secure information which may be stored in the personal Web page can be compromised. In addition to displaying this sham Web page, the smart Java card processor can be programmed to send a signal to the host computer, i.e., the computer processing the smart Java card, to notify an appropriate authority such as a law enforcement authority. This is useful in a situation when the card owner is forced unwillingly to access the card. Thus, referring back to FIG. 3, at step 314, when the secondary PIN is entered, a Web page having non-secure information is displayed at step 316, and at 318, appropriate notification is sent with the recording of the event. At step 320, if neither correct PIN nor secondary PIN were entered, a warning message is displayed. At step 322, a number of times the wrong PIN was entered is recorded. If the number does not exceed a predetermined number, at step 308, a user is prompted to enter a PIN again. If the number exceeds the predetermined number of times, the event is recorded at step 324, and at step 326, the user is exited from the procedure.

The block diagram 200 illustrating one embodiment of an internal configuration for a smart Java card is shown in FIG. 2. The configuration shown in FIG. 2 includes an One-Time-Programmable (OTP) memory 202 which is used to store critical information for extended security checks. The information stored in the OTP memory 202 are not erasable by any methods. Such permanent storage of information is useful for storing information about the card's authenticity and for recording any attempts of unsuccessful entries of PIN. The latter can be an important information for law enforcement officials when investigating how and when the card has been tempered. Additionally, the smart Java card includes a conventional non-volatile 204 and volatile 206 memory for storing intermediary data used during processing. The processor 208 typically commands and controls data signals communicated to the smart Java card via the input/output buffer 212. The processor also controls the crypto-engine 210 whenever a security key needs to be coded or decoded as described above. The secure communication protocol between the card and the host may be any prevailing secure protocols used in the Internet including the Secure Socket Layer (SSL) or Secure HTTP (S-HTTP).

The personal Web site embedded inside a smart Java card may be carried around anywhere by a person in a wallet or a purse. The smart Java card has a Web page written by either conventional or Java language, which can be accessed by any Web browsers with proper authorization. All or part of the conventional Internet communication and security protocols may be used between the smart Java card and the host computer processing the card. The personal Web site can be accessed when the smart Java card is inserted into a smart Java card reader connected to a host computer, i.e., either a personal computer or a bank ATM. The host computer having a running Web browser may then view the personal Web page by keying in the Web address, e.g., the URL. Alternatively, the personal Web site can initiate a contact to the host Web browser when the smart card is inserted into the reader. When the host Web browser detects the personal Web page from the smart Java card, further communications can be started. Such communications would follow the smart card and the host authenticity checks as wells as the validity the person that uses the Web browser by using PIN, encryption keys, security certificate, any/or passwords procedures as described above. The personal Web page is thus enabled to provide personal secret links, including a link to the card holder's bank account. Moreover, if the host computer processing the smart Java card, e.g., a bank's ATM machine, is equipped with a camera and a microphone in the vicinity of the card reader, the bank computer may additionally programmed to match the person's physical profiles as detected from the camera and/or the microphone in real time with those of the information stored in the smart Java card and/or the bank's own computer. Additional advantage with using the smart Java card to store secure information is that the card is off line when it is not inserted in a reader and therefore, more difficult to temper with by hackers or in case of spoofing. Moreover, the smart Java card of the present invention is easily adaptable by the community because it uses a widely available Internet communications and security protocols and is runnable on any platform having a Java-enabled browser or interpreter.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for enabling multiple security check points during electronic transactions between a smart card and a host computer, the smart card having one or more personal Web pages stored therein, the method comprising:

using a processing computer to establish communications between the smart card and the host computer;

receiving verification data from a user to identify the authenticity of the user;

transmitting first data from the smart card to the host computer;

the host computer processing the first data from the smart card to verify the authenticity of the smart card;

the host computer transmitting second data from the host computer to the smart card;

the smart card processing the second data from the host computer to verify the authenticity of the host computer;

providing the smart card with an encryption engine to encode data on the card and to decode data sent to the card;

if each of the user, the smart card, and the host computer is verified as authentic, then the smart card transmitting one or more of said personal Web pages to the host computer for display;

storing in the smart card user identification data and a secure key or security certificate from a given institution;

the step of transmitting first data from the smart card to the host computer including:
  i) inserting the smart card into a reader, and
  ii) sending the secure key or security certificate to the host computer when the smart card is inserted into the reader;

the step of the host computer processing the first data including the host computer combining the secure key or security certificate with the user identification data to form combined data;

the step of the host computer transmitting second data to the smart card including the host computer sending the combined data to the smart card;

the step of the smart card processing the second data including the smart card decoding the combined data to recover therefrom the user identification data, and comparing the recovered user identification data with the stored user identification data; and displaying one or more of said personal Web pages, wherein the step of displaying includes transmitting said one or more Web pages having a link to one or more other Web sites accessible over a computer network, said one or more other Web sites having additional personal secure information associated with the user.

2. The method as claimed in claim 1, further including displaying one or more of said personal Web pages, wherein the step of displaying includes transmitting said one or more Web pages having personal secure information associated with the user.

3. The method as claimed in claim 1, wherein the step of displaying includes transmitting said one or more Web pages having a link to the one or more other Web sites, said one or more other Web sites accessible over a computer network.

4. The method as claimed in claim 3, wherein the method further includes:
  accessing said one or more other Web sites from said one or more Web pages; and
  automatically providing by one or more of said personal Web pages security data required for accessing said one or more other Web sites from said one or more Web pages.

5. The method as claimed in claim 1, wherein the step of transmitting includes displaying said one or more Web pages having a link to one or more other Web sites, said one or more other Web sites for processing electronic transactions over a computer network.

6. The method as claimed in claim 1, wherein the step of receiving verification data includes receiving any one of personal identification number (PIN), image data relating to physical attributes of the user, finger print data relating to the user, and voice characteristics relating to the user, or any combination thereof, the verification data used to verify user identity.

7. The method as claimed in claim 1, wherein the step of processing the data from the smart card to verify the authenticity of the smart card includes validating a digital signature stored in the smart card.

8. The method as claimed in claim 1, wherein the step of processing the data from the host card computer to verify the authenticity of the host computer includes:
  receiving the secure key generated using a public key;
  decrypting the secure key with a private key; and
  determining whether the host computer is authentic.

9. The method as claimed in claim 1, wherein the step of receiving verification data includes receiving a secondary PIN and the step of transmitting includes displaying a sham Web page having non-secure information, in response to receiving the secondary PIN.

10. The method as claimed in claim 9, wherein the method further includes:
  sending data signals to a law enforcement authority for apprising the law enforcement authority of an emergency situation when the secondary PIN is received from the user.

11. The method as claimed in claim 1, wherein the method further includes:
  decoding by using a PIN, a stored secure key associated with a remote account server accessible over a computer network, before accessing the remote account server.

12. The method as claimed in claim 11, wherein the method further includes the remote account server validating the secure key combined with said PIN before allowing electronic transactions to be performed with the remote account server.

13. The method as claimed in claim 1, wherein the method further includes:
  encrypting secure contents of said one or more Web pages stored in the smart card when the smart card is not being used; and
  decrypting the secure contents before the step of checking the authenticity of the smart card.

14. The method as claimed in claim 1, wherein the method further includes:
  initiating a communication with the computer when the smart card is inserted into a card reading device; and
  invoking a Web browser in the host computer for processing said one or more Web pages stored in the smart card.

15. The method as claimed in claim 1, wherein the method further includes:
  recording in a one-time-programmable memory, the memory embedded in the smart card, selected events processed with the smart card.

* * * * *